UNITED STATES PATENT OFFICE.

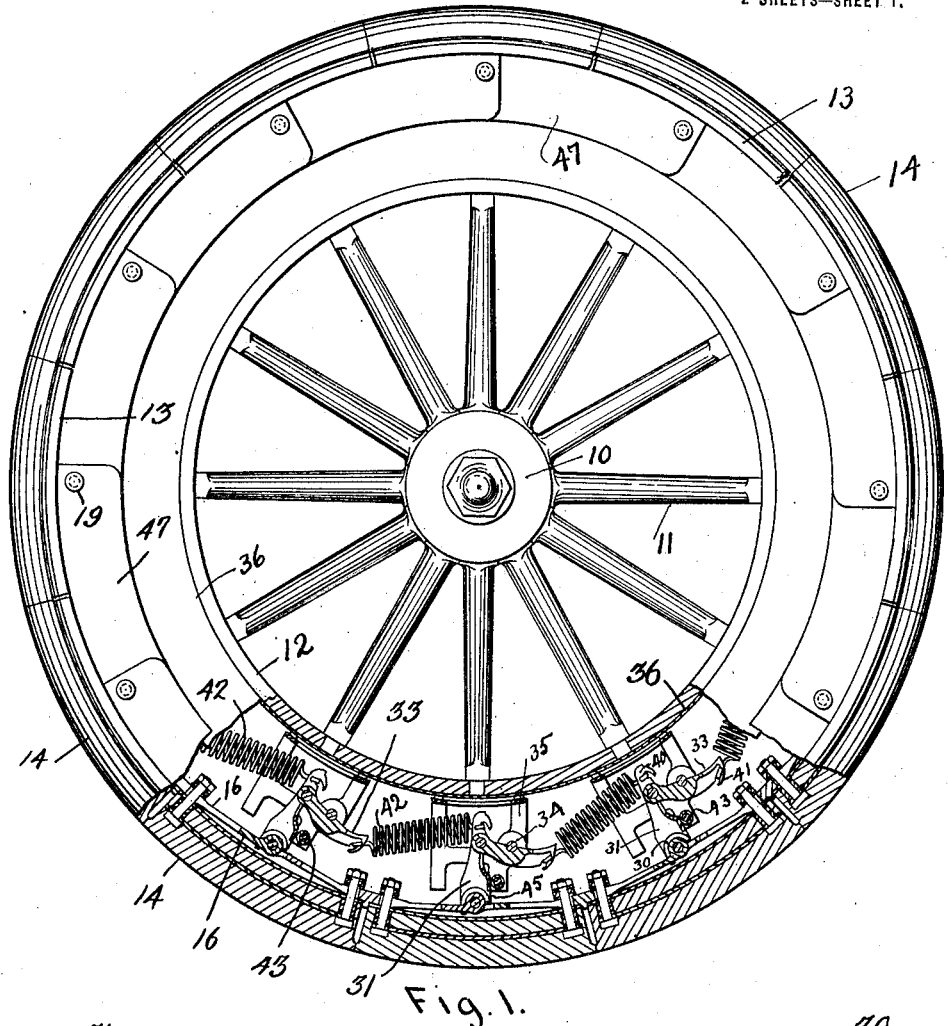
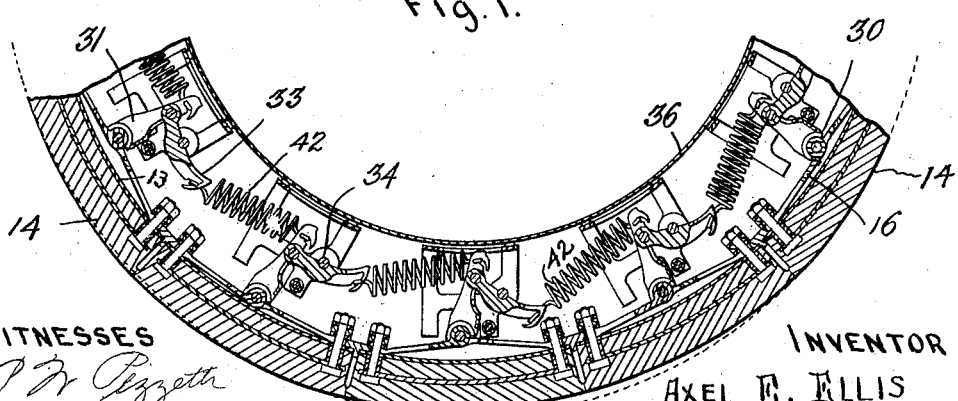

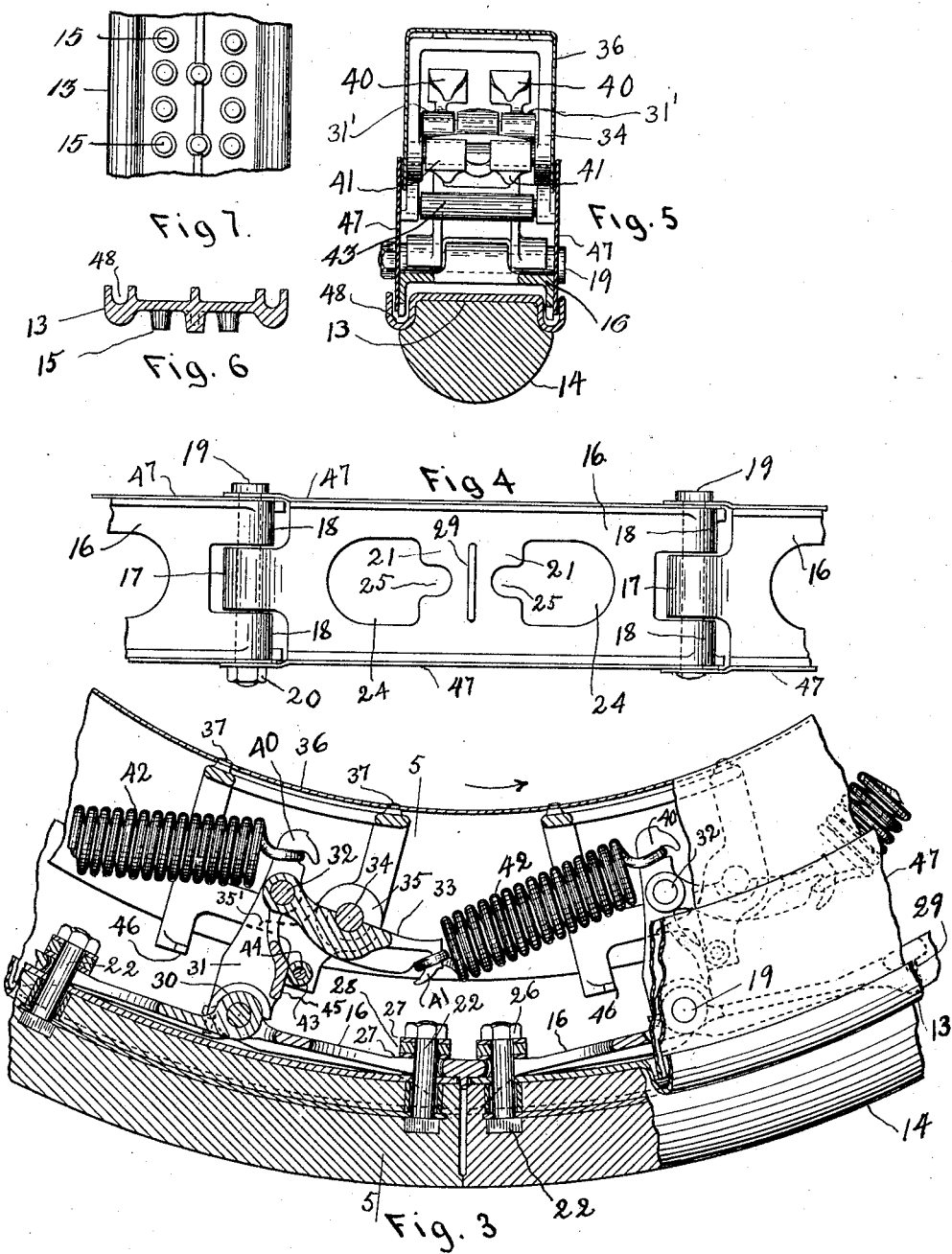

AXEL E. ELLIS, OF BOSTON, MASSACHUSETTS.

VEHICLE-WHEEL.

1,395,099.　　　　Specification of Letters Patent.　　Patented Oct. 25, 1921.

Application filed January 9, 1915, Serial No. 1,343. Renewed March 19, 1921. Serial No. 453,708.

*To all whom it may concern:*

Be it known that I, AXEL E. ELLIS, a citizen of the United States, and resident of Boston, in the county of Suffolk and State of Massachusetts, have invented certain new and useful Improvements in Vehicle-Wheels, of which the following is a specification.

This invention relates to vehicle wheels, and consists in improvements on the wheel shown and described in U. S. Letters Patent 972,606, granted me October 11, 1910. One of the improvements of the present invention is the arrangement of the resilient load-sustaining means whereby the load-sustaining springs are utilized to sustain circumferential stress between the traction rim and the body of the wheel.

Of the accompanying drawings, which illustrate the invention:

Figure 1 represents a side elevation of a wheel, the lower portion thereof being shown in vertical section, the wheel being in its normal condition.

Fig. 2 represents a vertical section of the lower portion of such wheel in distorted condition, as when sustaining a load, the normal outline of the wheel being represented by a dotted line.

Fig. 3 represents, on a larger scale, a vertical section through a portion of the wheel, the parts being in normal position.

Fig. 4 represents an elevation of the outer side of the articulated foundation rim of the wheel.

Fig. 5 represents a cross section in the plane indicated by line 5—5 of Fig. 3.

Fig. 6 is a cross section of one form of traction rim.

Fig. 7 is an elevation of a portion of the traction rim shown by Fig. 6, looking toward the traction surface thereof.

The same reference characters indicate the same parts wherever they occur.

Before describing the details of the wheel structure, it may be stated that the wheel comprises an articulated traction rim, an articulated foundation rim, and yielding means arranged to carry the foundation rim so that the sections or units of the latter may yield radially and circumferentially.

Referring now to Fig. 1, the wheel shown thereby comprises a hub 10, spokes 11, a continuous annular felly 12, and other elements, carried by the felly, including the yielding articulated rims.

The traction rim comprises a circular series of segmental sections 13 which, as shown by Figs. 1, 2, 3 and 5, are provided with cushioning members 14, while the form shown by Figs. 6 and 7 is provided with traction studs 15. The sections 13 are arranged in end-to-end relation, to form a substantially continuous rim. The traction rim is carried by an articulated foundation rim, the latter consisting of an endless series of sections 16. Each section 16 has a hinge boss 17 at one end and separated hinge bosses 18 at the other end, and each boss 17 of one section is arranged between the bosses 18 of the next section and connected thereto by a hinge-pin 19. One of the hinge-pins 19 is threaded to coact with a nut 20, but all the other hinge-pins may be and preferably are in the form of rivets, one removable hinge-pin being all that is necessary for the purpose of assembling and taking apart the wheel.

The rim sections of the traction rim are arranged to break joint with the rim sections of the foundation rim, the end portions of the former being the only portions thereof which bear against the latter. As indicated in Fig. 4, the portions 21 of the sections 16 are the seats for the end portions of the sections 13, said seats being substantially midway between the hinges of 16. The sections 13 are fastened to the sections 16 by bolts 22. Each section 16 has holes 24 through which the inner ends of the bolts 23 may be inserted. Adjoining such holes are recesses 25 into which the bolts may be moved laterally. Nuts 26 are threaded upon the inner ends of the bolts, and suitable washers are interposed between the nuts and the inner faces of the sections 16. I have shown two metal washers 27 and an intermediate washer 28 of resilient material upon each bolt. The confronting ends of each two adjacent sections 13 are separated by lips 29 formed upon the sections 16, said lips being effective for locating the sections 13 circumferentially with relation to the sections 16 and also being effective for sustaining circumferential stress as between the two articulated rims.

The hinge bosses 18 are seated in substantially U-shaped sockets 30 formed at the outer ends of floating levers 31. The fulcrum pins of the levers 31 are indicated at 32, and each pin 32 is carried by a lever 33. The fulcrum pins for the levers 33 are indicated at 34 and are affixed to rigid supports 35. These supports are preferably forgings. They are fixed with relation to the wheel felly 12, although according to the structure shown they are not connected directly to the felly but are affixed to an annular member 36 which in turn is mounted upon the felly. The annular member 36, as shown, is substantially U-shaped in cross section (see Fig. 5) and is made of sheet metal, the open side being toward the periphery of the wheel. This member is a part of a housing which incloses the yielding load-sustaining mechanism, the other elements of such housing being hereinafter described. The connection between the forgings 35 and the housing member 36 is effected, in the present instance, by forming studs 37 on the forging and swaging such studs in holes in the housing member.

Each floating lever 31 has two hooks 40 at its inner end, both of which appear in Fig. 5, and each lever 33 has two hooks 41 at one end. Helical tension springs 42 are engaged with the hooks 40 and 41 to connect the levers 31 of one group or unit with the levers 33 of the next group or unit, said springs being continuously under tension. The springs 42, levers 33 and levers 31 form a continuous series of interengaged members by which the foundation rim is held constantly under stress in a direction away from the center of the wheel, such stress being due to the tendency of the levers 33 to rock on their fulcra 34. The same springs 42 also maintain a constant stress upon the floating levers 31, tending to rock said levers about their fulcra 32, and such levers are thereby held normally against stops 43. These stops as shown are in the form of bushings and are rotatably mounted upon pins 44, said pins being mounted in the forgings 35. The levers 31 have faces 45 which are so disposed as to be substantially radial with relation to the center of the wheel when the levers are in their normal positions against the stops 43. The faces 45 roll toward and from the center of the wheel upon the bushings 44 in consequence of radial movement of the hinges which connect the sections 16. It is due to the conjoint action of the springs 42 and levers 33 that the foundation rim is caused to sustain the load upon the wheel. The forgings 35 have stop portions 35' (see Fig. 3) which are arranged to be engaged by the bosses of levers 31 in which the pivot pins 32 are arranged, such bosses projecting laterally as shown at 31' in Fig. 5. The effect of such engagement is to limit the radial movement of the levers 31 away from the center of the wheel. The traction rim and foundation rim are both capable of limited circumferential movement relatively to the body of the wheel, which movement is due to the capacity which the levers 31 have for angular movement about their fulcra 32. For example, if the wheel is used for driving and if driven in the direction of an arrow in Fig. 3, the rotative stress as between the levers 33 and the foundation rim is sustained by the levers 31 and springs 42, and such stress will, in case of too sudden application of driving power, cause the body of the wheel to rotate relatively to the rim elements. This will cause the fulcra 32 to move to the right (Fig. 3); and as the traction rim is frictionally engaged with the ground, the body of the wheel will rotate relatively to the rim until the angular movement of the levers 31 has increased the effective tension of springs 42 sufficiently to equal the rotative stress. Back stops 46 are formed upon the casting 35 to be engaged by the levers 31 to limit the angular movement of said levers about their fulcra 32. These stops will ultimately sustain the rotative stress if such stress cannot be equaled by the springs 42. In this connection it is to be noted that such rotative stress, when starting or when an increase of power is too suddenly applied, affects each and every spring 42, said springs in such case contributing equally toward resisting relative rotative movement of the rim and body of the wheel. The spring resistance to radial movement of the rim portions does not fall upon the entire series of springs 42 but is sustained only by those springs which are directly connected to the rim sections which are displaced radially from their normal positions.

It is clear that there would not be any relative rotative movement as between the body and rim of the wheel if the driving stress should be exerted in the opposite direction, referring to the arrow in Fig. 3; for in this case the stops 43 would prevent angular movement of the levers 31 which would be necessary to such relative rotative movement. Consequently, if the wheel is so mounted as to turn in the direction of the arrow in Fig. 3 to drive the vehicle forwardly, rearward driving stress and braking stress would be transmitted positively, whereas if the wheel should be mounted in the reverse position so as to effect a positive forward drive, the springs 42 would be effective for rendering reverse driving stress and braking stress yielding.

The housing, hereinbefore mentioned, which includes the continuous annular member 36 as one of its elements, includes also two circular series of sheet-metal plates 47. These plates are affixed respectively to the sections 16 of the foundation rim and are lapped with the outer surfaces of the member 36. (See Fig. 5). The plates 47 are lapped relatively to each other, and the hinge-pins 19 extend through the portions so lapped. In order to make the housing as effective as possible to exclude dirt from the spring and lever mechanism, the traction rim is formed with grooves or channels 48 on its inner side, and the outer edges of the plates 47 are arranged in said grooves or channels. There is sufficient clearance between the outer edges of the plates and the bottoms of the grooves to permit the necessary degree of relative angular movement between the traction rim sections and the foundation rim sections. Such angular movement, though slight, is necessary to enable the hinge portions to move radially with relation to the traction rim sections. Inasmuch as the housing members 47 are affixed to the rim sections 16, the former are capable of moving circumferentially and radially with relation to the continuous housing member 36.

A structural feature worthy of mention is that the levers 31 and 33 are detachable from their mountings without removing the fulcrum pins 34. This is because the fulcrum pins do not pass through the levers 33, the levers being formed with semi-cylindric seats instead of holes for coacting with the pins. Another structural feature is that the entire series of sections 16 of the foundation rim may be detached from the levers 31 by merely withdrawing the one hinge-pin 19 which has a nut 20 (Fig. 4). The withdrawal of such pin is all that is necessary to unwrap the foundation rim from the wheel, the hinge portions 18 being then free to be removed from the sockets 30. All that is necessary thereafter in order to detach the levers 31 and 33 is to unhook the springs from such levers, whereupon the levers 33 may be withdrawn from between the fulcrum pins 34 and stops 43. This form of structure and arrangement simplifies the operation of assembling the wheel and of substituting new springs or levers in case any one of them is broken.

Comparing Figs. 1 and 2, it may be seen that the angle of levers 33 is less effective when said levers are in normal position (Fig. 1) than when they are displaced from normal position by a load stress, as in Fig. 2. The effective angularity increases as the load strain increases, such increase of angularity applying the spring force with increasing effect. Thus, aside from variations in spring force, the load-sustaining mechanism is more responsive to light stresses and impacts than to heavier stresses and impacts, said mechanism having, in that respect, a very desirable action.

I claim:

1. A wheel having a rim, a tire composed of a series of inflexible tread sections loosely connected at their ends, a radially disposed lever connected with said tread section, a lever pivoted at one end to an intermediate point of each radial lever and intermediately pivoted to the wheel rim, and a tension spring joining the end of each radial lever with the free end of an adjacent intermediately pivoted lever.

2. A wheel comprising a wheel body, a circular series of levers carried thereby, a circular series of floating levers each carried by one of the first-mentioned levers, a circular series of relatively movable rim members carried by said floating levers, and helical tension springs each arranged to coact with one of the first-mentioned levers and with one of said floating levers to sustain radial and circumferential stresses between said wheel body and rim members.

3. A wheel comprising a wheel body, relatively movable rim members encircling but spaced from said wheel body, a series of radially disposed levers pivotally carried by the rim members, a series of levers each pivoted at one end to an intermediate point of a radial lever and pivotally supported at an intermediate point by the wheel body, and helical springs each tensionally joining the free end of a radial lever to the free end of an adjacent intermediately pivoted lever.

4. A wheel comprising a wheel body, a rim surrounding but spaced from the wheel body, a series of radially disposed levers pivotally carried by the rim, a series of levers each pivoted at one end to an intermediate point of a radial lever and having a pivot at an intermediate point thereof, a series of frames carried by the wheel body each supporting one of said pivots and provided with a stop for limiting the swing of a radial lever, and a series of helical springs each tensionally joining the free end of a radial lever to the free end of an intermediately pivoted lever.

5. A wheel comprising a wheel body, an articulated rim including rim members having pivotal connections connecting them in an endless series, a series of radially disposed levers pivotally connected at one end of each to said pivotal connections, a series of levers each pivoted at one end to one of said radial levers, and intermediately pivoted to members carried by the wheel body, each of said levers having a hook at its free end and tension springs engaging said hooks.

6. A wheel comprising a wheel body, a rim surrounding but spaced from the wheel body, members carried by the wheel body approaching but spaced from the rim, a series of radially disposed levers pivotally carried by the rim, each lever having an oblique surface near but spaced from its pivotal point, an antifriction roll for each oblique surface carried by one of said members, a lever pivoted at one end to each of said radial levers and itself pivotally supported by one of said members substantially parallel with adjacent portions of the rim, and tension springs joining the free end of each of the last-recited levers, to a radial lever.

7. A wheel comprising a wheel body, an articulated rim surrounding but spaced from the wheel body, a series of inflexible members each substantially equal to one of the articulations of the rim, each of said members attached at its mid-length to the neighboring ends of two of said articulations, the ends of said members being pivotally joined each to the adjacent ones, and resilient means resisting the inward thrust of the pivoted ends of said members.

8. A wheel comprising a wheel body, an articulated rim surrounding but spaced from the wheel body, a series of inflexible members each substantially equal to one of said articulations of the rim, said members being each attached at its mid-length to the adjacent ends of two of said articulations, and their ends being pivotally united each with the next, a radial lever being terminally pivoted to each of said pivotal unions of said members, an intermediately pivoted lever having one end pivoted to one end of a radial lever, and a helical spring connecting the free end of each intermediately pivoted lever to the inner end of a radial lever, said intermediate pivot being connected with said wheel body.

In testimony whereof I have affixed my signature, in presence of two witnesses.

AXEL E. ELLIS.

Witnesses:
WALTER P. ABELL.
JOHN E. POVEY.